US009786271B1

(12) United States Patent
Combs et al.

(10) Patent No.: US 9,786,271 B1
(45) Date of Patent: Oct. 10, 2017

(54) VOICE PATTERN CODING SEQUENCE AND CATALOGING VOICE MATCHING SYSTEM

(71) Applicant: International Business Machines Corporation, Armonk, NY (US)

(72) Inventors: Judith M. Combs, Stuart, FL (US); Peeyush Jaiswal, Boca Raton, FL (US); Priyansh Jaiswal, Boca Raton, FL (US); David Jaramillo, Lake Worth, FL (US); Annita Tomko, Jalisco (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/278,073

(22) Filed: Sep. 28, 2016

(51) Int. Cl.
 *G10L 15/14* (2006.01)
 *G10L 21/00* (2013.01)
 *G10L 25/00* (2013.01)
 *G10L 15/00* (2013.01)
 *G10L 15/26* (2006.01)
 *G10L 15/06* (2013.01)
 *G10L 17/00* (2013.01)
 (Continued)

(52) U.S. Cl.
 CPC ............ *G10L 15/07* (2013.01); *G10L 15/005* (2013.01); *G10L 15/02* (2013.01); *G10L 15/063* (2013.01); *G10L 15/22* (2013.01); *G10L 2015/0635* (2013.01)

(58) Field of Classification Search
 CPC ....... G10L 15/22; G10L 15/265; G10L 15/08; G10L 15/187; G10L 15/063; G10L 17/005; G10L 25/30; G10L 21/0208; G11C 2207/16; G06F 17/2785; H05K 666/99
 See application file for complete search history.

(56) References Cited

U.S. PATENT DOCUMENTS 6,263,311 B1 7/2001 Dildy
6,304,845 B1 10/2001 Hunlich et al.
(Continued)

FOREIGN PATENT DOCUMENTS

EP 1750252 A2 2/2007
TW 200912731 A 3/2009

OTHER PUBLICATIONS

"Biometrics-Voice Verification" Internet Archive Wayback Machine Jan. 21, 2016. <http://web.archive.org/web/20161212147​51/http://www.globalsecurity.org/security/systmes/biometrics-voice.htm>.
(Continued)

*Primary Examiner* — Anne Thomas-Homescu
(74) *Attorney, Agent, or Firm* — William H. Hartwell

(57) ABSTRACT

A method for voice pattern coding and catalog matching. The method includes identifying a set of vocal variables for a user, by a voice recognition system, based, at least in part, on a user interaction with the voice recognition system. The method further includes generating a voice model of speech patterns that represent the speaking of a particular language using the identified set of vocal variables, wherein the voice model is adapted to improve recognition of the user's voice by the voice recognition system. The method further includes matching the generated voice model to a catalog of speech patterns, and identifying a voice model code that represents speech patterns in the catalog that match the generated voice model. The method further includes providing the identified voice model code to the user.

17 Claims, 5 Drawing Sheets

(51) Int. Cl.
*G10L 15/04* (2013.01)
*G10L 15/18* (2013.01)
*G10L 13/00* (2006.01)
*G06F 17/27* (2006.01)
*G10L 15/07* (2013.01)
*G10L 15/22* (2006.01)
*G10L 15/02* (2006.01)

(56) References Cited

U.S. PATENT DOCUMENTS

| | | | |
|---|---|---|---|
| 7,206,746 B1 | 4/2007 | McIntosh | |
| 7,386,443 B1* | 6/2008 | Parthasarathy | G10L 15/07 455/418 |
| 7,454,337 B1* | 11/2008 | Smith | G10L 17/04 704/240 |
| 8,036,893 B2 | 10/2011 | Reich | |
| 2004/0148161 A1* | 7/2004 | Das | G10L 15/07 704/224 |
| 2005/0080625 A1* | 4/2005 | Bennett | G06F 17/3043 704/249 |
| 2005/0165602 A1* | 7/2005 | Cote | G10L 15/183 704/9 |
| 2005/0261901 A1* | 11/2005 | Davis | G10L 15/19 704/235 |
| 2007/0033054 A1* | 2/2007 | Snitkovskiy | G06F 3/167 704/275 |
| 2008/0147404 A1* | 6/2008 | Liu | G10L 17/26 704/256.2 |
| 2010/0312560 A1* | 12/2010 | Ljolje | G10L 15/07 704/254 |
| 2011/0313767 A1* | 12/2011 | Duffield | G10L 15/187 704/251 |
| 2013/0332158 A1* | 12/2013 | Corfield | G10L 15/07 704/235 |
| 2015/0032443 A1* | 1/2015 | Karov | G06F 17/2785 704/9 |
| 2015/0302850 A1* | 10/2015 | Lebrun | G06F 3/167 704/243 |
| 2015/0310865 A1* | 10/2015 | Fay | G10L 15/22 704/254 |
| 2016/0293159 A1 | 10/2016 | Belisario et al. | |
| 2016/0322046 A1* | 11/2016 | Lahiri | G10L 25/75 |
| 2016/0329048 A1* | 11/2016 | Li | G10L 15/07 |

OTHER PUBLICATIONS

"Panatone-Wikipedia, the free encyclopedia" Mar. 16, 2016. <https://en.wikipedia.org/w/index.php?title=Pantone&oldid=710366677>.

* cited by examiner

VOICE PATTERN CODING SEQUENCE AND CATALOGING VOICE MATCHING SYSTEM

BACKGROUND

The present invention relates generally to the field of voice recognition, and more particularly to voice pattern coding and catalog matching.

Many computing devices include voice, or speech, interfaces to assist users in interfacing with the computing devices. Currently, voice recognition software applications can use model speech patterns/formulas which can be attained by various means. In some cases, interfaces are command driven, where users can speak a predefined set of commands, and in other cases, interfaces allow free form speech. Manufacturers or providers of voice interfaces typically pre-set one language as a default, but provide the user with the option to change the primary speaking language if needed.

Known speech interfaces may include automatic speech recognition (ASR) engines which support multiple language recognition capabilities with a predefined set of assumptions. Typical ASR engines require training time for learning a user's vocabulary, where the engines are trained to recognize words spoken by the user.

SUMMARY

Embodiments of the present invention disclose a method, computer program product, and system for voice pattern coding and catalog matching. The method includes identifying a set of vocal variables for a user, by a voice recognition system, based, at least in part, on a user interaction with the voice recognition system. The method further includes generating a voice model of speech patterns that represent the speaking of a particular language using the identified set of vocal variables, wherein the voice model is adapted to improve recognition of the user's voice by the voice recognition system. The method further includes matching the generated voice model to a catalog of speech patterns, and identifying a voice model code that represents speech patterns in the catalog that match the generated voice model. The method further includes providing the identified voice model code to the user.

DETAILED DESCRIPTION

Embodiments in accordance with the present invention recognize that every voice has a unique combination of tones, inflections, lung force, and environmental influences which result in a personal, unique sound. These variables influencing voice patterns can make it difficult for voice recognition systems to interact with end-users, and can lead to higher error rates and increased setup times, for example.

Embodiments in accordance with the present invention recognize that a voice pattern cataloging system, similar to that of a color matching system, may be desired. For example, some color matching systems provide codes representing colors. These codes can be used in printing to provide printers with a defined color model, resulting in consistency and repeatability regardless of the ink, printing paper, or printer being used. Some embodiments of the present invention implement a concept similar to a color matching system, but with voice patterns, utilizing voice patterns as a constant (i.e. a code) and recordable vocal variables as the unique elements that comprise the voice patterns. These embodiments provide a catalog of voice patterns which provide a standardization of vocal variables, in order to more closely match a person's voice pattern. This catalog of standard patterns (with assigned values) can allow for a closer voice pattern match for the interaction between a voice recognition system and an end-user, minimizing "training periods," loss of time due to trial and error, and improved end-user satisfaction with the voice recognition system.

In an example, a user interfaces with a voice recognition unit via a setup interface. The user identifies vocal variables relating to the user's language and speech pattern (e.g., influence of a geographic background on the user's speech pattern, the user's base-language being spoken, tones, inflections, lung force, etc.). The voice recognition unit then identifies a voice code based on matching the vocal variables provided by the user to a catalog of speech patterns. The user can then confirm and utilize that voice code with other voice recognition systems that have been adapted to utilize the voice code system implemented by the catalog, thereby improving the voice recognition systems' ability to recognize the user's voice.

Figure 1:
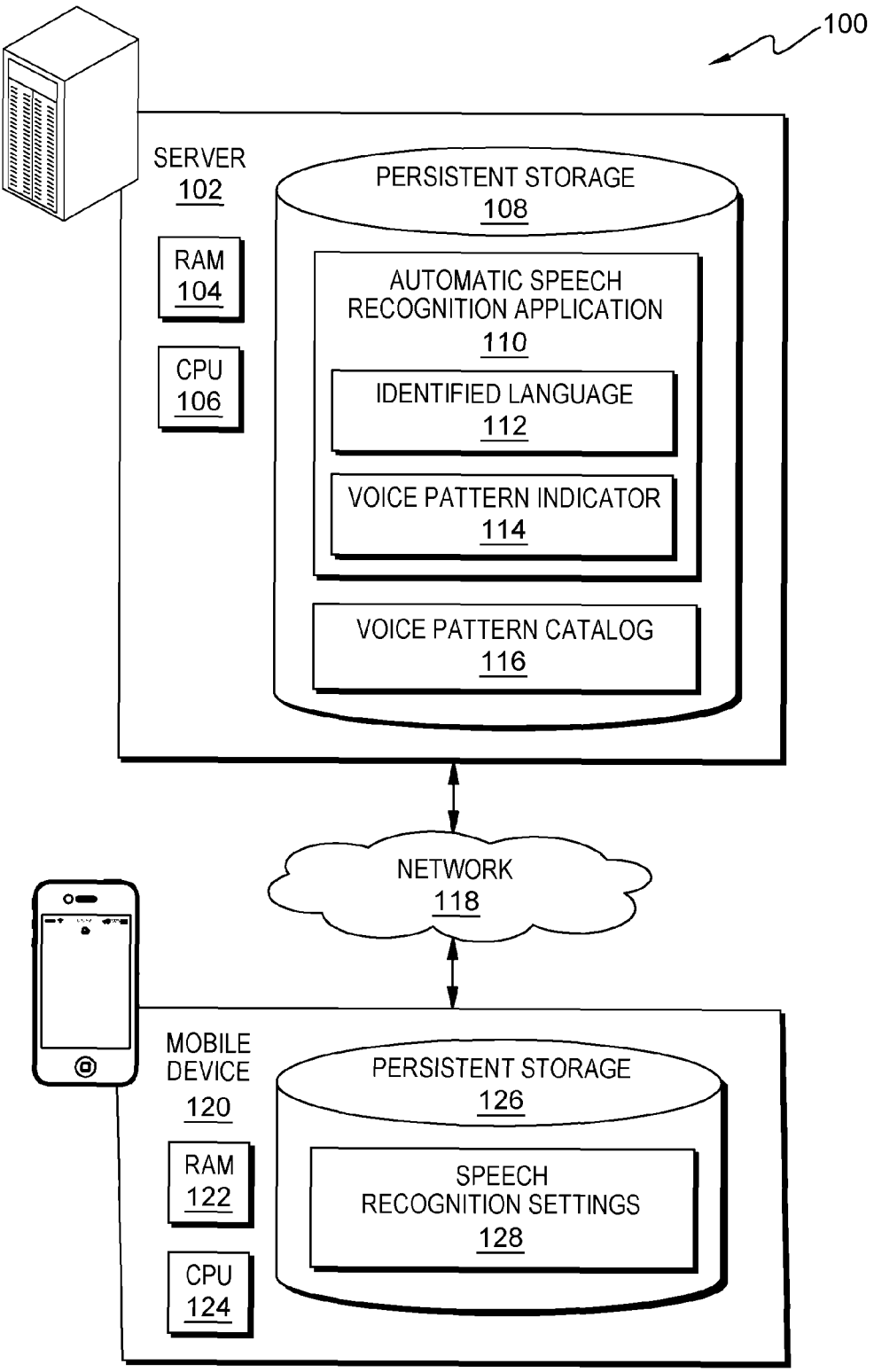
FIG. 1 is a functional block diagram illustrating a speech recognition environment, in an embodiment in accordance with the present invention.

Embodiments in accordance with the present invention will now be described in detail with reference to the Figures. FIG. 1 is a functional block diagram, generally designated 100, illustrating a speech recognition environment, in an embodiment in accordance with the present invention.

Speech recognition environment 100 includes server 102, mobile device 120, and other computing devices (not shown), all interconnected over network 118. Server 102 includes random access memory (RAM) 104, central processing unit (CPU) 106, and persistent storage 108. Server 102 may be a Web server, or any other electronic device or computing system, capable of processing program instructions and receiving and sending data. In some embodiments, server 102 may be a laptop computer, a tablet computer, a netbook computer, a personal computer (PC), a desktop computer, a personal digital assistant (PDA), a smart phone, or any programmable electronic device capable of communicating over a data connection to network 118. In other embodiments, server 102 may represent server computing systems utilizing multiple computers as a server system, such as in a distributed computing environment. In general, server 102 is representative of any electronic device or combinations of electronic devices capable of executing machine-readable program instructions and communicating with mobile device 120 via network 118 and with various components and devices (not shown) within speech recognition environment 100.

Server 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Server 102 may include internal and external hardware components, as depicted and described in further detail with respect to FIG. 5.

Automatic speech recognition (ASR) application 110 and voice pattern catalog 116 are stored in persistent storage 108, as well as operating system software (not shown), that enables server 102 to communicate with mobile device 120 and other computing devices (not shown) of speech recognition environment 100 over a data connection on network 118. In other example embodiments, automatic speech recognition application 110 and voice pattern catalog 116 may be components of an operating system software.

Automatic speech recognition application 110 is a computer program, or set of computer programs, that is stored in persistent storage 108. Automatic speech recognition application 110 contains identified language 112 and vocal pattern indicator 114. Additionally, automatic speech recognition application 110 enables a user to mix two or more language patterns to produce a speech pattern that is closer to the user's accent, for example. A language pattern (i.e., accent), can include the influence of a geographic background on the user's speech pattern, the user's base-language being spoken, tones, inflections, lung force, etc. For example, the user can indicate the levels of the selected languages to mix, to provide the system with a starting point for a personalized speech recognition model. For example, upon interfacing with a voice recognition unit (VRU) via a phone call, a user can be prompted to select two or more languages, or language patterns, to create a personalized speech pattern that is more closely related to the user's language pattern. For example, the user can select "English" and "Hindi" to create a language pattern that is similar to the user's spoken accent. In other example embodiments, automatic speech recognition application 110 can be contained and/or executed on mobile device 120 and/or other computing devices (not shown) of speech recognition environment 100.

Identified language 112 is a computer program setting, or a list of computer program settings, that is stored in persistent storage 108. Identified language 112 contains two or more selected language patterns by a user. Continuing with the previous example, upon selecting "English" and "Hindi", automatic speech recognition application 110 stores the two or more selected language patterns in identified language 112. In one example embodiment, identified language 112 can be associated with a user profile to automatically provide the selected language pattern with the user's spoken accent every time the user calls in to a VRU. The user can lock in, or save the selected language pattern in the user profile to protect the selected language pattern. This will allow the user to call the VRU from any device (e.g., mobile phone, LAN line phone, or computer device), and automatically have the custom selected language pattern (s) for the VRU to match voice responses to. In other example embodiments, identified language 112 can be contained and/or executed on mobile device 120 and/or other computing devices (not shown) of speech recognition environment 100.

Vocal pattern indicator 114 is a computer program setting that is stored in persistent storage 108. Vocal pattern indicator 114 includes, amongst other things, a level of a user's accent. Continuing with the pervious example, upon selecting "English" and "Hindi", automatic speech recognition application 110 assigns a numerical value representing the selected speech pattern that will be associated with the user. In other example embodiments, vocal pattern indicator 114 can be contained and/or executed on mobile device 120 and/or other computing devices (not shown) of speech recognition environment 100.

Vocal pattern indicator 114 can generate voice models of speech patterns for users of ASR application 110. For example, upon determining vocal patterns in a user's voice, vocal pattern indicator 114 can generate a voice model for the user, where the voice model represents the speaking of a particular language (determined via identified language 112) using the determined vocal patterns, or, more specifically, using the vocal variables that comprise the determined vocal patterns. The voice model can then be used to improve recognition of the user's voice by ASR application 110.

Voice pattern catalog 116 is a computer program, or set of computer programs, that is stored in persistent storage 108. Voice pattern catalog 116 is a catalog of voice patterns, used by a VRU, to provide a standardization of vocal variables in order to more closely match a person's voice pattern. Each voice has a unique combination of vocal variables, such as tones, inflections, lung force, and environmental influences. All these variables influencing the voice tones could result in a higher error rate during a voice recognition process. Voice pattern catalog 116 is a catalog of standard patterns, with assigned values, which will allow a user to establish a closer voice pattern match for the interaction between the voice recognition system and the user, minimizing "training periods", loss of time due to trial and error, and improving user satisfaction with the voice recognition system. In other example embodiments, voice pattern catalog 116 can be contained and/or executed on mobile device 120 and/or other computing devices (not shown) of speech recognition environment 100.

In FIG. 1, network 118 is shown as the interconnecting fabric between server 102, mobile device 120, and with various components and devices (not shown) within speech recognition environment 100. In practice, the connection may be any viable data transport network, such as, for example, a LAN or WAN. Network 118 can be for example, a local area network (LAN), a wide area network (WAN) such as the Internet, or a combination of the two, and include wired, wireless, or fiber optic connections. In general, network 118 can be any combination of connections and protocols that will support communications between server 102, mobile device 120, and with various components and devices (not shown) within speech recognition environment 100.

Mobile device 120 is included in speech recognition environment 100. Mobile device 120 includes RAM 122, CPU 124, and persistent storage 126. Mobile device 120 may be a Web server, or any other electronic device or computing system, capable of processing program instructions and receiving and sending data. In some embodiments, mobile device 120 may be a laptop computer, a tablet computer, a netbook computer, a personal computer, a desktop computer, a PDA, a smart phone, or any programmable electronic device capable of communicating over a data connection to network 118. In other embodiments, mobile device 120 may represent server computing systems utilizing multiple computers as a server system, such as in a distributed computing environment. In general, mobile device 120 is representative of any electronic devices or combinations of electronic devices capable of executing machine-readable program instructions and communicating with server 102 via network 118 and with various components and devices (not shown) within speech recognition environment 100.

Mobile device 120 includes persistent storage 126. Persistent storage 126 may, for example, be a hard disk drive. Alternatively, or in addition to a magnetic hard disk drive, persistent storage 126 may include a solid state hard drive, a semiconductor storage device, read-only memory, erasable programmable read-only memory, flash memory, or any other computer-readable storage medium that is capable of storing program instructions or digital information. Speech recognition settings 128 is stored in persistent storage 126, which also includes operating system software, as well as software that enables mobile device 120 to detect and establish a connection to server 102, and communicate with other computing devices (not shown) of speech recognition environment 100 over a data connection on network 118.

Speech recognition settings 128 is a computer program setting that is stored in persistent storage 126. Speech recognition settings 128 is used by mobile device 120 to configure the language settings of automatic speech recognition application 110 and to store the returned voice code of the identified voice model in voice pattern catalog 116. Storing the identified voice model in voice pattern catalog 116 allows a user of mobile device 120 to connect to any ASR/VRU and automatically use the preferred language setting to reduce input errors and/or misinterpretation of commands.

Figure 2A:
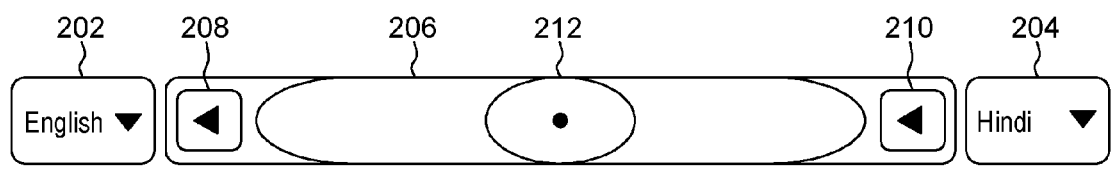
FIGS. 2A and 2B are examples of user interfaces of an automatic speech recognition application, on a server computer within the speech recognition environment of FIG. 1, for providing a customizable and individualized speech recognition settings interface for users with multiple accents, in an embodiment in accordance with the present invention.
Figure 2B:
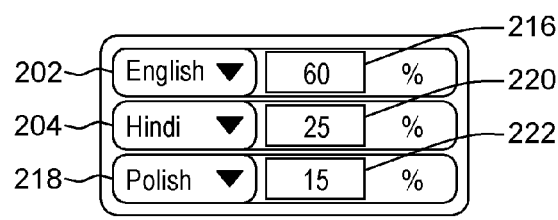

FIGS. 2A and 2B are examples of user interfaces of an automatic speech recognition application, on a server computer within the speech recognition environment of FIG. 1, for providing a customizable and individualized speech recognition settings interface for users with multiple accents/voice patterns, in an embodiment in accordance with the present invention. It should be appreciated that FIGS. 2A and 2B provide only an illustration of two implementations and do not imply any limitations with regard to the environments in which different embodiments may be implemented. Many modifications to the depicted environment may be made.

In an example embodiment, a user connects to automatic speech recognition application 110 on server 102 using mobile device 120. Upon connecting to server 102, automatic speech recognition application 110 presents the user with a graphical user interface (GUI) to select two or more languages to create a customized speech pattern that is similar to the user's spoken accent. In one example embodiment, automatic speech recognition application 110 can display the GUI to the user using a web interface. In another example embodiment, automatic speech recognition application 110 can display the GUI to the user by executing an application on mobile device 120.

Automatic speech recognition application 110 directs the user to select two languages using dropdown 202 and 204. The user selects "English" and "Hindi" as depicted in the example embodiment of FIG. 2A. Upon selecting "English" and "Hindi", the user is directed to determine the amount of preferred accent by using slide bar 206 and adjuster 212. The user can also use button 208 and 210 to adjust amount of preferred accent. For example, the user can slide adjuster 212 to the right for a stronger "Hindi" accent. In one example embodiment, automatic speech recognition application 110 can assign a value to represent the level, or amount, of accent based on the position of adjuster 212.

In another example embodiment, the user is presented with a GUI to select two or more languages and enter a percentage for each selected language as depicted in FIG. 2B. For example, upon being presented with a GUI, automatic speech recognition application 110 can direct the user to enter two or more languages and a percentage for each enter language. For example, the user can select "English" 202 and a numerical value of 60% as indicated in 216. The user can then select "Hindi" 204 and a numerical value of 25% as indicated in 220. Additionally, the user can select "Polish" 218 and a numerical value of 15% as indicated in 222. In another example embodiment, FIG. 2B can be presented to the user under an advanced menu setting. In other example embodiments, automatic speech recognition application 110 can include configuration settings to represent a user's geographic region, the user's base-language being spoken, tones, inflections, lung force, etc.

Figure 3:
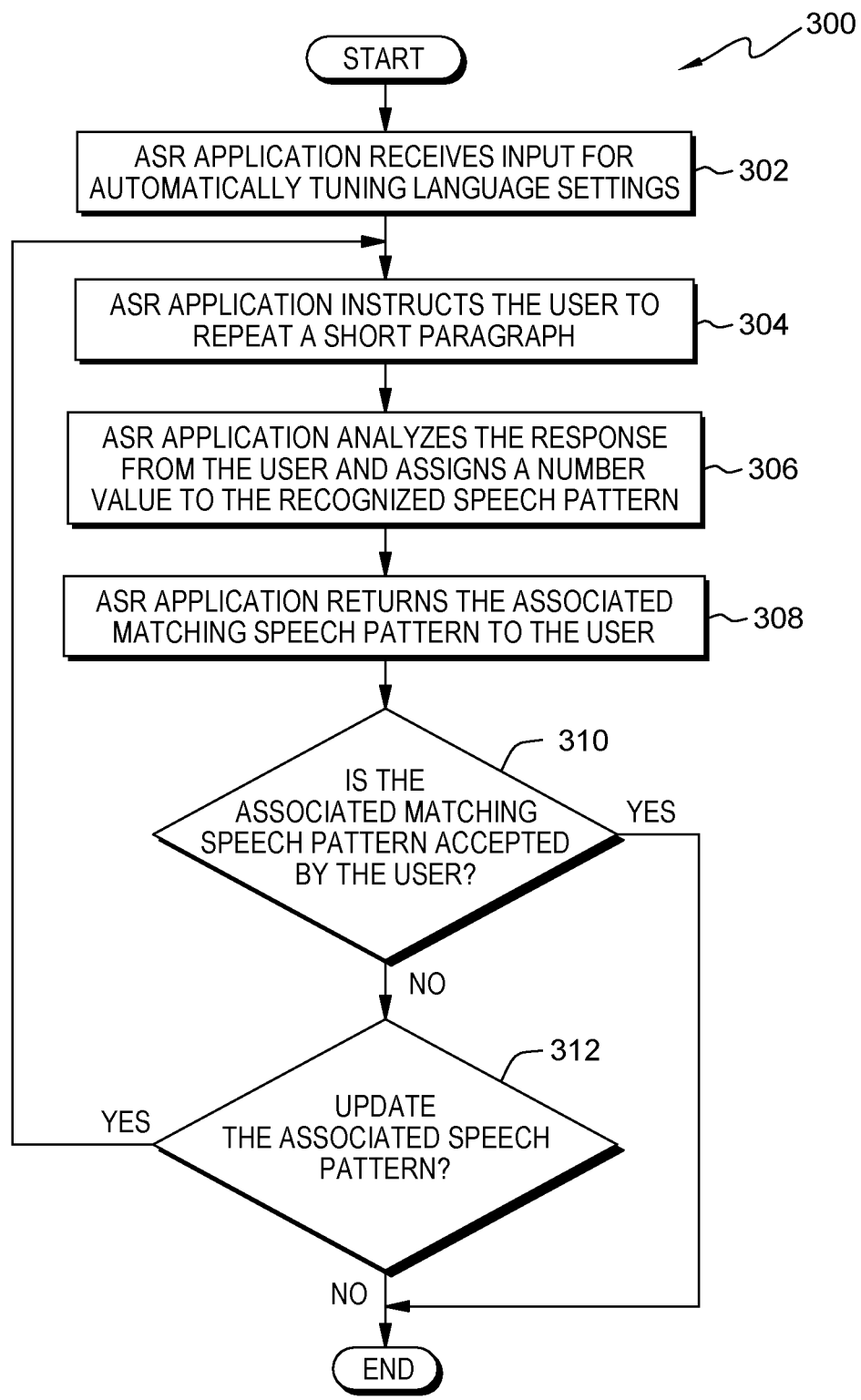
FIG. 3 is a flow chart illustrating operational steps of an automatic speech recognition application, on a server computer within the speech recognition environment of FIG. 1, for automatically selecting the language and accent settings of a user, in an embodiment in accordance with the present invention.

FIG. 3 is a flow chart, generally designated 300, illustrating operational steps of an automatic speech recognition application, on a server computer within the speech recognition environment of FIG. 1, for automatically selecting the language and accent settings of a user, in an embodiment in accordance with the present invention.

In an example embodiment, a user connects to automatic speech recognition (ASR) application 110 on server 102, for the first time, using mobile device 120 and creates a user profile that includes language setting options. Upon connecting to automatic speech recognition application 110, the user is directed to configure the language settings that will be stored in the user profile. In this example embodiment, automatic speech recognition application 110 can be set to a default language of "English." Automatic speech recognition application 110 receives input from the user of mobile device 120 for automatically tuning the language settings as depicted in step 302. For example, the user can make the indication by providing a numerical response to automatic speech recognition application 110. For example, automatic speech recognition application 110 can play a voice message stating "To automatically configure your language settings, please press one." In another example embodiment, the user can make the indication by selecting the option for automatic language configuration on a web interface. In other example embodiments, the user can select an option for automatic language configuration using a mobile application executing on mobile device 120.

In step 304, automatic speech recognition application 110 instructs the user to repeat a short paragraph. For example, the user is asked to speak the name and address associated with the user profile. The spoken name and address associated with the user profile is then saved by automatic speech recognition application 110 and can be used at a later time to also verify the user's identity. In another example, the user is asked to recite a short paragraph containing commonly used responses for automatic speech recognition application 110. In one example embodiment, automatic speech recognition application 110 displays the short paragraph on a user interface of mobile device 120.

Automatic speech recognition application 110 analyzes the response from the user and assigns a number value to the recognized speech pattern as depicted in step 306. For example, upon receiving the response for the user, automatic speech recognition application 110 analyzes the user's voice to determine one or more geographic regions, the user's base-language being spoken, tones, inflections, lung force, and compares the user's speech pattern (i.e., generated voice model), to a plurality of stored language patterns in voice pattern catalog 116 and assigns a number value (i.e., voice model code), to the response that closely matches a stored language pattern in voice pattern catalog 116. Stated another way, automatic speech recognition application 110 matches the generated voice model to the patterns in voice pattern catalog 116, and identifies a voice model code that represents speech patterns in catalog 116 that match the generated voice model.

In step 308, automatic speech recognition application 110 returns the associated matching speech pattern to the user. For example, upon analyzing the recited short paragraph, automatic speech recognition application 110 can return one or more identified languages. Continuing with the example embodiment of FIG. 2A, automatic speech recognition application 110 returns an identified language of "English" and "Hindi," indicating that the user spoke both English and Hindi when reciting the short paragraph. Additionally, automatic speech recognition application 110 can return an accent indication. For example, automatic speech recognition application 110 returns an identified language of "English" and "Hindi" and accent amount of 48% indicating the user has a strong "Hindi" accent. In this example, a 48% accent indication of "Hindi" indicates that the user pronounces words in the same manner as a person from India.

In decision step 310, automatic speech recognition application 110 determines if the associated matching speech pattern is accepted by the user. For example, automatic speech recognition application 110 prompts the user to indicate if the identified language of "English" and "Hindi", and accent amount of 48%, is acceptable. For example, automatic speech recognition application 110 can play back the name and address of the user using the matching language pattern stored in identified language 112 and vocal pattern indicator 114. If automatic speech recognition application 110 determines that the associated matching speech pattern is accepted by the user ("Yes" branch, decision 310), no more changes are made and automatic speech recognition application 110 can save the user profile information.

In one example embodiment, the back-end processing engine of automatic speech recognition application 110 can indicate a low accuracy evaluation of the spoken short paragraph, the user can be presented with an update request to his/her user profile. In this example embodiment, the user can accept or modify it thru the automatic speech recognition application 110 user interface (e.g., web interface, VRU, or mobile application executing on mobile device 120). If automatic speech recognition application 110 determines that the associated matching speech pattern is not accepted by the user ("No" branch, decision 310), automatic speech recognition application 110 determines if the user wants to update the associated speech pattern and accent as depicted in decision step 312.

In decision step 312, automatic speech recognition application 110 determines if the user wants to update the associated matching language pattern stored in identified language 112 and vocal pattern indicator 114. For example, the user can provide feedback for updating the associated matching language pattern if the user does not like the audible sound of the associated matching language pattern. If automatic speech recognition application 110 determines that the user wants to update the associated matching language pattern stored in identified language 112 and vocal pattern indicator 114 ("Yes" branch, decision 312), automatic speech recognition application 110 repeats steps 304 through 310 as depicted in FIG. 3. If automatic speech recognition application 110 determines that the user does not want to update the associated matching language pattern stored in identified language 112 and vocal pattern indicator 114 ("No" branch, decision 312), no more changes are made and automatic speech recognition application 110 can save the user profile information.

Figure 4:
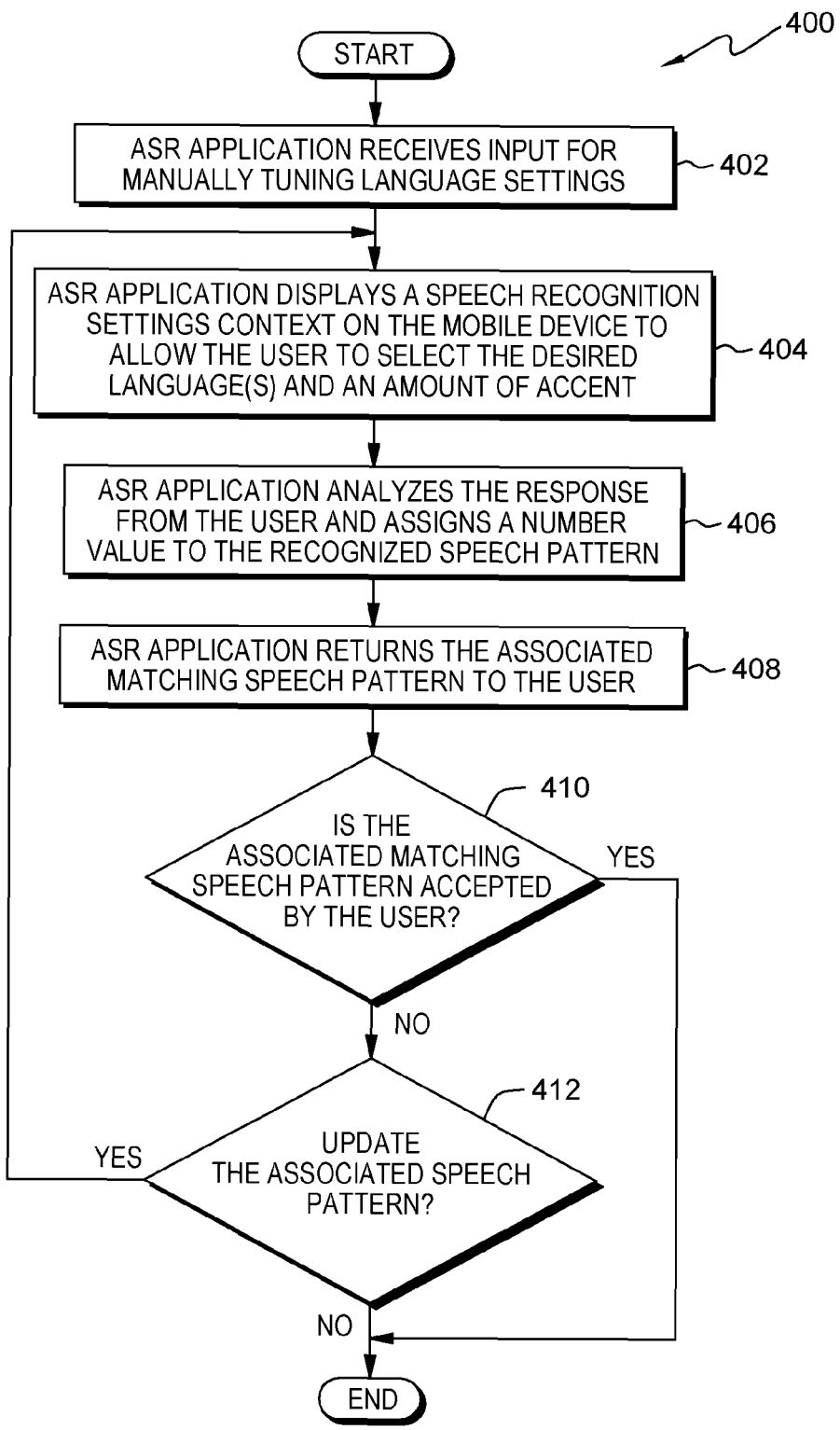
FIG. 4 is a flow chart illustrating operational steps of an automatic speech recognition application, on a server computer within the speech recognition environment of FIG. 1, for manually selecting the language and accent settings of a user, in an embodiment in accordance with the present invention.

FIG. 4 is a flow chart, generally designated 400, illustrating operational steps of an automatic speech recognition application, on a server computer within the speech recognition environment of FIG. 1, for manually selecting the language and accent settings of a user, in an embodiment in accordance with the present invention.

In an example embodiment, a user purchases a smart phone (e.g., mobile device 120) that includes automatic speech recognition application 110 or a client application that is capable of communicating with automatic speech recognition application 110 on server 102. Upon using mobile device 120, the user finds that automatic speech recognition application 110 is not recognizing most of the vocal commands that are being given due to the user's accent.

Automatic speech recognition application 110 receives input from mobile device 120 for manually tuning the language settings as depicted in step 402. For example, the user accesses speech recognition settings 128, located in a user interface settings on mobile device 120 to configure the default language.

In step 404, automatic speech recognition application 110 displays a speech recognition settings context on the mobile device to allow the user to select the desired language(s) and an amount of accent. The user selects "English" as the first language and "Hindi" as the second language as described in FIG. 2A. The user sets adjuster 212 to 70% "Hindi" and 30% "English", meaning that "English" is spoken with a heavy "Hindi" accent and saves the settings.

Automatic speech recognition application 110 analyzes the response from the user and assigns a number value to the speech pattern indicated by the user's response, as depicted in step 406. For example, upon receiving the response for the user, automatic speech recognition application 110 identifies a set of vocal variables (e.g., influence of a geographic background on their speech pattern, the user's base-language being spoken, tones, inflections, lung force, etc.), and compares the user's speech pattern to a plurality of stored language patterns in voice pattern catalog 116 and assigns a number value to the response that closely matches a stored language pattern in voice pattern catalog 116. For example, automatic speech recognition application 110 compares the selected languages and the indicated accent to stored speech patterns in voice catalog 116 and generates a voice model of speech patterns that represents the user's particular language using the identified set of vocal variables. Upon matching the indicated languages (e.g., "English" and "Hindi") and the indicated accent (e.g., 70% "Hindi" and 30% "English), automatic speech recognition application 110 assigns a number value representing the associated languages and accent level stored in voice catalog 116. For example, automatic speech recognition application 110 assigns a voice model code to the generated voice model. In one example embodiment, the number can be a summation representing identified language 112 and vocal pattern indicator 114. For example, automatic speech recognition application 110 can assign the value "1" to indicate "English" and the value "10" to indicate "Hindi", wherein the returned value is a number between "1" and "10" depending on the accent. A stronger accent will result in a higher accent indicator. In some embodiments, automatic speech recognition application 110 can identify a set of vocal variables comprising a tone, an inflection, a lung force, environmental influences including an accent of a speech pattern, and a base-language being spoken.

In step 408, automatic speech recognition application 110 returns the associated matching speech pattern to the user, wherein the associated matching speech pattern is a combination of the user's geographic background (i.e., where they are from), the user's base-language being spoken (e.g., "English" or "Hindi"), tones, inflections, lung force, etc. For example, automatic speech recognition application 110 can display identified language(s) 112 and vocal pattern indicator 114 then provide the user with an audio response of the users name and address using identified language(s) 112, vocal pattern indicator 114 and voice catalog 116. In another example embodiment, automatic speech recognition application 110 can automatically display the identified language (s) 112 and vocal pattern indicator 114 then provide the user with an audio response of a short paragraph.

In decision step 410, automatic speech recognition application 110 determines if the associated matching speech pattern is accepted by the user. For example, automatic speech recognition application 110 prompts the user to indicate if the identified language of 30% "English" and 70% "Hindi is acceptable to the user (after allowing the user to listen to the audio response in step 408). If automatic speech recognition application 110 determines that the associated matching speech pattern is accepted by the user ("Yes" branch, decision 410), no more changes are made and automatic speech recognition application 110 can save the user profile information. If automatic speech recognition application 110 determines that the associated matching speech pattern is not accepted by the user ("No" branch, decision 410), automatic speech recognition application 110 determines if the user wants to update the associated speech pattern and accent as depicted in decision step 412.

In decision step 412, automatic speech recognition application 110 determines if the user wants to update the associated matching language pattern stored in identified language 112 and vocal pattern indicator 114. For example, the user may not like the played back response using the identified language of 30% "English" and 70% "Hindi. If automatic speech recognition application 110 determines that the user wants to update the associated matching language pattern stored in identified language 112 and vocal pattern indicator 114 ("Yes" branch, decision 412), automatic speech recognition application 110 repeats steps 404 through 410 as depicted in FIG. 4. If automatic speech recognition application 110 determines that the user does not want to update the associated matching language pattern stored in identified language 112 and vocal pattern indicator 114 ("No" branch, decision 412), no more changes are made and automatic speech recognition application 110 can save the user profile information and the generated voice model. Upon saving the user profile information and the generated voice model, automatic speech recognition application 110 can then utilize the generated voice model to improve recognition of the received voice input.

Upon reconnecting to server 102, automatic speech recognition application 110 can access mobile device 120 to determine if the user changed one or more settings (e.g., speech recognition settings 128) through predefined APIs and utilize the specific customized number which represents the user's speech pattern. Automatic speech recognition application 110 can interpret the specification of the user settings in terms of percent, score, and/or set of values of the accent mix. Automatic speech recognition application 110 can then transform the user preference information (now coded by the customized number) into the altered language model and recognition features. The back-end processing engine of automatic speech recognition application 110, continues to fine tune speech pattern recognition as the user is utilizing the speech recognition function by using the customized speech pattern as a starting point, therefore minimizing the rate of voice recognition error. As automatic speech recognition application 110 fine tunes the customized speech pattern, updates to speech recognition settings 128 with recognized language pattern are sent to mobile device 120. The update is provided in the form of a specific number representing speech pattern that is associated with the user. In other example embodiments, the user can go into automatic speech recognition application 110 user interface at any time to manually re-adjust the degree and mixture of languages in order to provide a higher rate of recognition. In another example embodiment, upon being satisfied with the speech recognition performance, a user may protect the settings so that they can only be changed manually. To change the settings requires a manual input from the user to release speech recognition settings 128 from the protected mode.

Some embodiments of the present invention provide a user with a number or code that matches the user's unique vocal variables that were initially provided to automatic speech recognition application 110. The provided number or code can be utilized with other voice systems which utilize either ASR application 110 or voice pattern catalog 116. For example, voice pattern catalog 116 can be used by existing ASR systems, such that when the user establishes an acceptable voice pattern code, the user could input that code into those existing ASR systems, thereby minimizing setup problems, continued voice pattern recognition problems, and time spent to acquire the correct interaction algorithm, and improving customer satisfaction with the results. In addition, voice pattern catalog 116 can reduce input errors and/or misinterpretation of commands of end-users of any ASR/VRU system.

In another example embodiment, automatic speech recognition application 110 can determine that the speech pattern of the generated voice model does not match any of the speech patterns in the voice pattern catalog 116. Upon determining that the speech pattern of the generated voice model does not match any of the speech patterns in the voice pattern catalog 116, automatic speech recognition application 110 can save, to voice pattern catalog 116, the speech pattern of the generated voice model that does not match any of the speech patterns in voice pattern catalog 116.

Research has shown that automatic speech recognition can consume about 10 to 30% of execution cycles when recognizing new voice patterns. The use of voice pattern catalog 116 can help with the initial setup time, resulting in higher end user satisfaction. The use of voice pattern catalog 116 will also require less ASRs to handle calls, resulting in savings for the providers as well.

Figure 5:
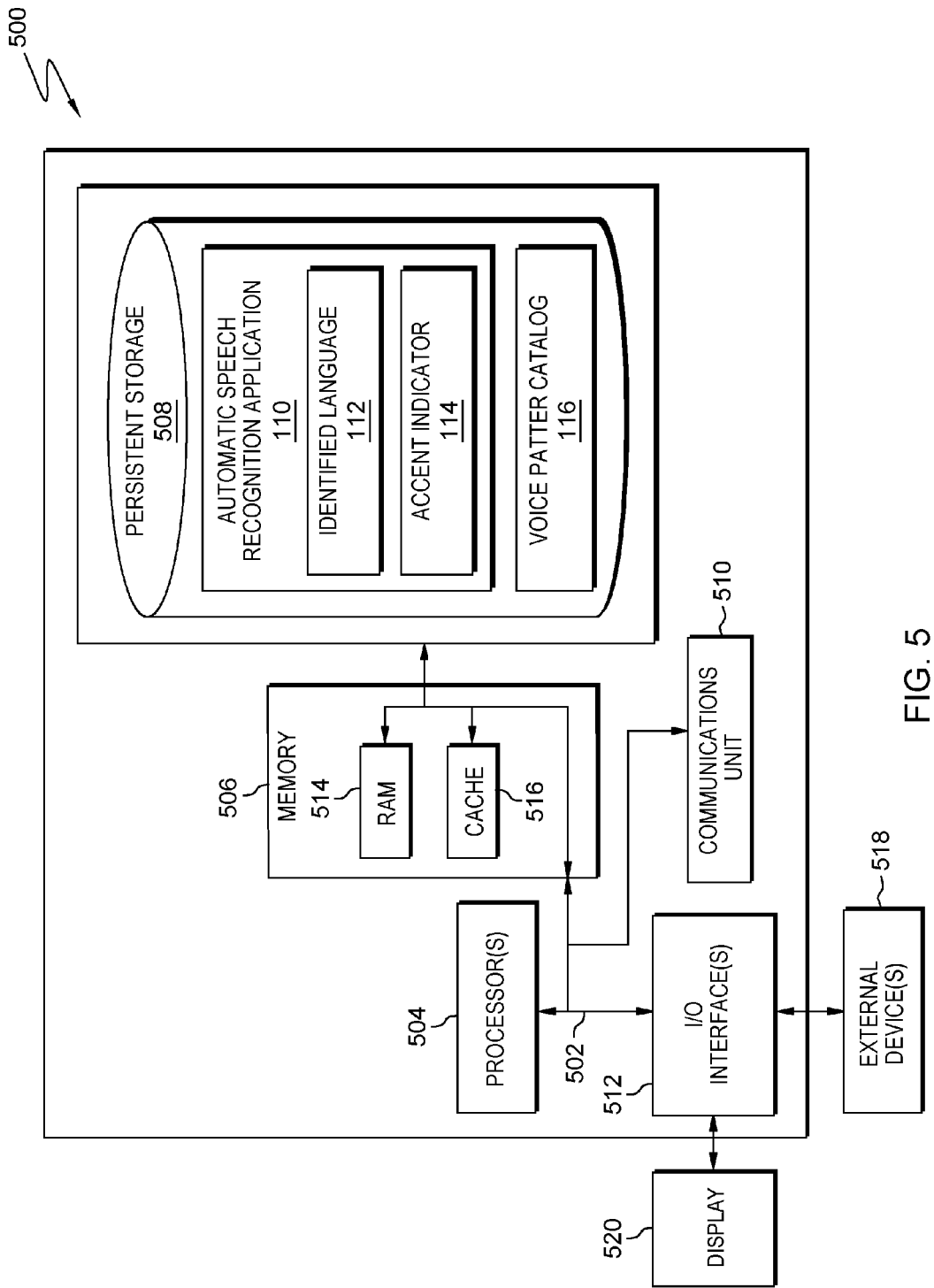
FIG. 5 depicts a block diagram of components of the proxy server computer executing the intelligent mapping program, in an embodiment in accordance with the present invention.

FIG. 5 depicts a block diagram, generally designated 500, of components of the proxy server computer executing the intelligent mapping program, in an embodiment in accordance with the present invention. It should be appreciated that FIG. 5 provides only an illustration of one implementation and does not imply any limitations with regard to the environments in which different embodiments may be implemented. Many modifications to the depicted environment may be made.

Server computer 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Automatic speech recognition application 110 and voice pattern catalog 116 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 118 and mobile device 120. In these examples, communications unit 510 includes one or more network interface cards. Communications unit 510 may provide communications through the use of either or both physical and wireless communications links. Automatic speech recognition application 110 and voice pattern catalog 116 may be downloaded to persistent storage 508 through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., automatic speech recognition application 110 and voice pattern catalog 116, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

DEFINITIONS

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Automatically" means "without any human intervention."

What is claimed is:

1. A computer-implemented method comprising:
    identifying a set of vocal variables for a user, by a voice recognition system, based, at least in part, on a user interaction with the voice recognition system, wherein the user interaction includes the user selecting a first language and a second language, and adjusting a level of accent, wherein the level of accent indicates an amount by which the second language affects the user's speaking of the first language;
    generating, by the voice recognition system, a voice model of speech patterns that represent the user's speaking of the first language using the identified set of vocal variables, wherein the voice model is adapted to improve recognition of the user's voice by the voice recognition system;
    matching, by the voice recognition system, the generated voice model to a catalog of speech patterns, and identifying a voice model code that represents speech patterns in the catalog that match the generated voice model;

providing, by the voice recognition system, the identified voice model code to the user;

receiving, by the voice recognition system, voice input from the user; and utilizing, by the voice recognition system, the generated voice model to improve recognition of the received voice input, based on the user providing the identified voice model code.

2. The computer-implemented method of claim 1, further comprising:

receiving, by the voice recognition system, voice input and a corresponding voice model code from a second user; and utilizing, by the voice recognition system, a voice model corresponding to the received voice model code in the catalog to improve recognition of the received voice input.

3. The computer-implemented method of claim 1, wherein matching, by the voice recognition system, the generated voice model to a catalog of speech patterns comprises:

determining, by the voice recognition system, that a speech pattern of the generated voice model does not match any of the speech patterns in the catalog; and saving, by the voice recognition system, to the catalog, the speech pattern of the generated voice model that does not match any of the speech patterns in the catalog.

4. The computer-implemented method of claim 1, further comprising:

prior to matching the generated voice model to the catalog of voice models, determining, by the voice recognition system, that the generated voice model is accepted by the user.

5. The computer-implemented method of claim 1, further comprising:

upon determining that the generated voice model is not accepted by the user, updating, by the voice recognition system, the generated voice model according to user feedback, wherein the user feedback includes the user further adjusting the level of accent.

6. The computer-implemented method of claim 1, wherein the set of vocal variables includes at least an influence of a geographic background on the user's speech pattern.

7. The computer-implemented method of claim 1, wherein the user interaction with the voice recognition system includes the user providing initial voice input to the voice recognition system.

8. The computer-implemented method of claim 6, wherein the set of vocal variables further includes at least an accent of the user's speech.

9. The computer-implemented method of claim 8, wherein the set of vocal variables further includes a tone, an inflection, and a lung force.

10. A computer program product comprising:

one or more computer readable storage media and program instructions stored on the one or more computer readable storage media, wherein the one or more computer readable storage media are not transitory signals per se, the program instructions comprising:

program instructions to identify a set of vocal variables for a user, by a voice recognition system, based, at least in part, on a user interaction with the voice recognition system, wherein the user interaction includes the user selecting a first language and a second language, and adjusting a level of accent, wherein the level of accent indicates an amount by which the second language affects the user's speaking of the first language;

program instructions to generate a voice model of speech patterns that represent the user's speaking of the first language using the identified set of vocal variables, wherein the voice model is adapted to improve recognition of the user's voice by the voice recognition system;

program instructions to match the generated voice model to a catalog of speech patterns, and identify a voice model code that represents speech patterns in the catalog that match the generated voice model;

program instructions to provide the identified voice model code to the user;

program instructions to receive voice input from the user; and program instructions to utilize the generated voice model to improve recognition of the received voice input, based on the user providing the identified voice model code.

11. The computer program product of claim 10, further comprising:

program instructions to receive voice input and a corresponding voice model code from a second user; and program instructions to utilize a voice model corresponding to the received voice model code in the catalog to improve recognition of the received voice input.

12. The computer program product of claim 10, wherein the program instructions to match the generated voice model to a catalog of speech patterns comprise:

program instructions to determine that a speech pattern of the generated voice model does not match any of the speech patterns in the catalog; and program instructions to save to the catalog, the speech pattern of the generated voice model that does not match any of the speech patterns in the catalog.

13. The computer program product of claim 10, further comprising:

program instructions to, prior to matching the generated voice model to the catalog of voice models, determine that the generated voice model is accepted by the user.

14. A computer system comprising:

one or more computer processors;

one or more computer readable storage media;

program instructions stored on the computer readable storage media for execution by at least one of the one or more processors, the program instructions comprising:18 program instructions to identify a set of vocal variables for a user, by a voice recognition system, based, at least in part, on a user interaction with the voice recognition system, wherein the user interaction includes the user selecting a first language and a second language, and adjusting a level of accent, wherein the level of accent indicates an amount by which the second language affects the user's speaking of the first language;

program instructions to generate a voice model of speech patterns that represent the user's speaking of the first language using the identified set of vocal variables, wherein the voice model is adapted to improve recognition of the user's voice by the voice recognition system;

program instructions to match the generated voice model to a catalog of speech patterns, and identify a voice model code that represents speech patterns in the catalog that match the generated voice model;

program instructions to provide the identified voice model code to the user;

program instructions to receive voice input from the user; and program instructions to utilize the generated voice model to improve recognition of the received voice input, based on the user providing the identified voice model code.

15. The computer system of claim 14, further comprising:

program instructions to receive voice input and a corresponding voice model code from a second user; and program instructions to utilize a voice model corresponding to the received voice model code in the catalog to improve recognition of the received voice input.

16. The computer system of claim 14, wherein the program instructions to match the generated voice model to a catalog of speech patterns comprise:

program instructions to determine that a speech pattern of the generated voice model does not match any of the speech patterns in the catalog; and program instructions to save to the catalog, the speech pattern of the generated voice model that does not match any of the speech patterns in the catalog.

17. The computer system of claim 14, further comprising:

program instructions to, prior to matching the generated voice model to the catalog of voice models, determine that the generated voice model is accepted by the user.

\* \* \* \* \*